UNITED STATES PATENT OFFICE.

JOSÉ F. NAVARRO, OF NEW YORK, N. Y.

PROCESS OF MANUFACTURING PORTLAND CEMENT.

SPECIFICATION forming part of Letters Patent No. 464,516, dated December 8, 1891.

Application filed April 10, 1891. Serial No. 388,423. (No specimens.)

*To all whom it may concern:*

Be it known that I, JOSÉ F. NAVARRO, a citizen of Spain, residing at New York, in the county of New York, State of New York, have invented certain new and useful Improvements in the Manufacture of Portland Cement; and I do hereby declare that the following is a full, clear, and exact description of the invention, which will enable others skilled in the art to which it appertains to make and use the same.

My invention relates to a process for the manufacture of Portland cement.

Portland cement consists in an intimate mixture of certain chemical ingredients—such as silica, alumina, iron, lime, and magnesia—in certain definite proportions, which cannot vary without changing the quality and properties of the manufactured article.

The usual method of manufacturing Portland cement consists of limestone, clay, and silica ground and mixed together in a wet state, then made into bricks, the bricks being then dried artificially, so as to drive off a portion of the water and render them sufficiently dry to hold together for handling, and are then burned in a vertical stationary kiln in which there is alternately a layer of coal or coke and a layer of bricks. These kilns are drawn in about six or eight days. The produce of such kilns consist of fully-burned clinkers, (from which the Portland cement is made,) underburned clinkers, which must be reburned, overburned, which is thrown away, dust, and residual products of combustion, which cannot be utilized for Portland cement. The process here to be considered does away with the formation of bricks, thus avoiding the labor, expense, and time necessarily involved in their manufacture and drying, and, as it will subsequently appear, entirely avoid the waste caused by the overburned and underburned material, as before stated. To accomplished the desired purpose I take argillaceous rock, containing aluminum, iron, lime, and magnesia. Such rock is generally deficient in carbonate of lime. The rock as it comes from the quarry is ground in a dry state to an impalpable powder (or as nearly so as possible) and is then tested to ascertain the deficiency in carbonate of lime. Limestone containing more lime than the argillaceous rock first ground is then separately ground to an impalpable powder and tested to ascertain its true amount of carbonate of lime. The deficiency of lime carbonate noted in the first powder is made up by adding a proper proportion of the second powder in order to get a mixture of the raw material that will bring the same chemical composition within very narrow limits.

To attain the desired proportions of lime in the raw material the following method has been and is being used: First, ascertain by analysis every hour (more or less) the average percentage of carbonate of lime in the argillaceous cement-rock before it is crushed and do the same with the lime-rock on equal conditions; second, ascertain in what proportions the two stones should be mixed in order to make a mixture with a given amount of carbonate of lime. If a cement-rock low in lime is used, then add to the mixture a proper proportion of cement-rock high in lime or pure limestone. If a cement-rock high in lime is used, then add to the mixture clay or cement-rock low in lime. When the right proportions of each kind of rock are ascertained by calculations based on analyses, and after they are respectively weighed in such proportions, they are fed simultaneously and carefully into the crushers, and the material so mixed passes through the grinders and pulverizers, being crushed, pulverized, and mixed at the same time. This mixture in given quantities is then placed in a periodical mixer and is worked there a sufficient time to become thoroughly mixed, when it is again analyzed for proof, and, in cases where it still requires lime, cement low in lime, already analyzed, or pure clay in sufficient quantity is added to the mixed mass. In cases where the mixture is low in lime, cement-rock high in lime or lime simple, previously analyzed, is added to the mass, such additions always being raw powders. The mixer is again worked a sufficient time to complete the operation. The powder thus analyzed is conveyed to a rotating kiln and burned to vitrifaction. The powder is fed into and is passed through the kiln continuously and emerges therefrom in hard vitrified clinkers, which are then ground and bolted, and after a proper degree of seasoning the resultant is Portland cement of commerce. It will thus be seen that in the avoidance of bricks (or the wet state of manufacture) time and labor are saved; that by grinding materials in their raw dry condition an accurate test of their chemical constituents can be at once ascertained and an absolute uniformity of the mixture determined, and that by continuous feed and discharge under a controlled temperature (impossible in a stationary kiln) a uniform product is obtained free from the objections before named in the old method of manufacture and burning.

Having thus described my invention, what I claim is—

The process of manufacturing Portland cement, which consists in grinding to powder in a dry state argillaceous rock containing the chemical constituents of Portland cement, then adding thereto, when deficient in lime, a definite proportion of cement-rock high in lime or limestone pure, also ground raw, then mixing the powders dry, next burning the same in a rotating kiln, and finally grinding the resultant clinkers to a powder.

JOSÉ F. NAVARRO.

Witnesses:
JAMES CLYNE,
JOSÉ F. TORAYE.